United States Patent Office 3,085,432
Patented Apr. 16, 1963

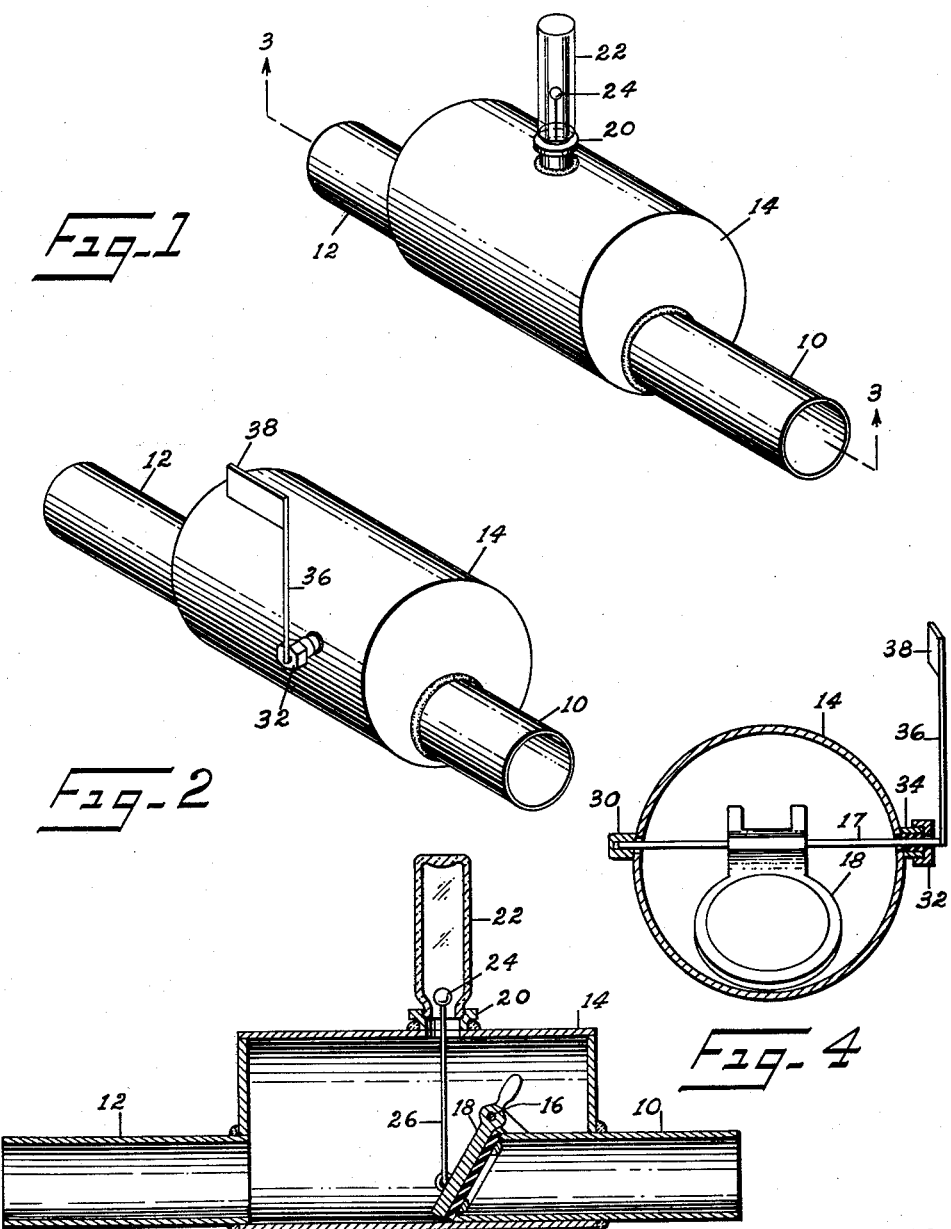

3,085,432
FLOW INDICATOR
Charles G. Bloom and Irving Arnold Chauncey, Lubbock, Tex.; said Chauncey assignor of one-fourth to Fred Arnold Chauncey and of one-fourth to James Reavis Chauncey
Filed Aug. 24, 1960, Ser. No. 51,670
1 Claim. (Cl. 73—228)

This invention pertains to hydraulics and more particularly to the combination of a flow indicator with a check valve.

This invention has utility with agricultural irrigation systems. Where a plurality of irrigation wells are tied into a common underground distribution system, it is necessary to use a check valve or other means for preventing water from flowing from the system into some well which is not operating. Also there is need for indicating whether any particular well is operating and the check valve open or the well is not operating if the check valve is closed properly. Further, there is need for an indicator to give a reading on the amount of water the well is producing.

With wells of this type, often when they are pumping all the water available in the underground strata they will "pump air", i.e., some air bubbles will be picked up with the water and carried along. This is an undesirable situation because the pump is attempting to pump more water than is available. A more economical operation would be for the pump to be adjusted to pump less water. Therefore, it would be desirable to have a simple indication in such a closed system of whether the well was pumping air.

The objects of this invention are to provide an apparatus which meets the requirements outlined above.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a perspective view of one embodiment of this invention.

FIG. 2 is a perspective view of a second embodiment of this invention.

FIG. 3 is an axial section of FIG. 1.

FIG. 4 is a cross section of FIG. 2.

Two embodiments have been illustrated in the accompanying drawings.

The embodiment of FIGS. 1 and 3 is the preferred embodiment because it provides an indication of air in the liquid stream, and because it is more adaptable to be installed as a modification upon an existing unit.

Inlet pipe 10 and outlet pipe 12 connect into housing 14. By means of ears a shaft 16 is attached to the inlet pipe. Flap valve 18 is attached for rotation to the shaft. The valve cooperates with the end of the inlet pipe to act as a check valve. If the pressure in the inlet pipe is greater than in the outlet pipe, the valve will open permitting the fluid to flow. However, should the pressure in the outlet pipe 12 become greater than in the inlet pipe 10, the valve will close. Closing of the valve is accomplished by gravity as well as differential pressures. The valve has a gasket or other means to cause it to make a fluid tight seal against the valve seat, which in this case, is the terminal of the inlet pipe.

A female nipple 20 is welded to the top of the housing. With water flowing under pressure in pipe 10, any air within the housing will find its way into the nipple and on out. The nipple has screw threads by which transparent tube 22 is attached. We have found it convenient to use a small bottle such as an olive bottle, as tube 22. A conventional gasket is used between the tube and the nipple to effect a fluid tight seal. Indicant 24 is located within the tube. The indicant is connected by pitman 26 to the valve. The axis of the tube is vertical while the axis of the shaft 16 is horizontal. It may readily be seen that the position of the indicant indicates the position of the valve. The tube or the indicant and the upper portion of the pitman may be graduated to more precisely indicate the amount the valve is open.

In use, with water flowing under positive pressure in pipe 10, the tube 22 would be filled with water and a hand held over the mouth of the tube while it was attached to the nipple 20. Although there may be some air in the top of the tube this is of small consequence. In operation if more air is accumulated in the tube 22, this will indicate that air is coming in the pipe 10. The rate in which air is accumulated in tube 22 will give an indication of the rate at which air is being pumped. A petcock could be attached to the top of the tube so that the air could be bled from the tube without the necessity of disconnecting it.

The embodiment shown in FIG. 2 has inlet 10, outlet 12, housing 14, and flap valve 18 in the same general arrangement as the previous embodiment. In the second embodiment, the shaft 17 is rotatable within journals 30 and 32 on either side of the housing. Flap valve is rigidly attached to the shaft so that the shaft rotates with the flap valve. The journal 30 is closed at the end to prevent the leakage of water. The shaft extends through the journal 32 so that a portion of the shaft is outside of the housing. Journal 32 includes packing gland 34 to prevent the loss of water around the journal. Such packing glands are well known in the art and are not further described here. For convenience in manufacturing we find that packing glands from household faucets may be used. Arm 36 is attached at right angles to that portion of the shaft which extends outside of the housing. Indicant 38 is carried at the end of the arm. A graduated segment could be attached to the housing to indicate more precisely the amount the flap valve was open or the indicant could itself be in the form of a segment cooperating with an indice on the housing to give the same information.

It will be apparent that the embodiments shown are only exemplary and that various modifications can be made in construction, materials, and arrangement within the scope of the invention as defined in the appended claim.

We claim as our invention:
In a check valve including:
 (a) an inlet pipe,
 (b) a flap valve,
 (c) a hinge ultimately interconnecting the valve and inlet pipe, and

(d) a housing connected to the inlet pipe and hiding the valve from view;

The improved flow indicator comprising:
(e) a transparent tube attached to the housing,
(f) said tube being attached to the uppermost portion of the housing,
(g) said tube being closed at the top,
(h) an indicant in the tube, and
(i) a pitman interconnecting the indicant and the valve;
(j) so arranged and constructed that if the system is normally pumping a liquid under positive pressure, that any air within the pumped liquid is trapped within the tube giving a visual indication thereof.

References Cited in the file of this patent

UNITED STATES PATENTS

| | | |
|---|---|---|
| 1,712,761 | Furnivall et al. | May 14, 1929 |
| 2,823,540 | Patch | Feb. 18, 1958 |
| 2,889,708 | Williams | June 9, 1959 |